United States Patent
Shier et al.

[15] 3,669,838
[45] June 13, 1972

[54] METHOD OF MAKING ANTIBIOTICS CONTAINING THE AMINOCYCLITOL SUBUNIT

[72] Inventors: Wayne Thomas Shier; Kenneth L. Rinehart, Jr.; David Gottlieb, all of Urbana, Ill.

[73] Assignee: University of Illinois Foundation, Urbana, Ill.

[22] Filed: March 17, 1970

[21] Appl. No.: 20,433

Related U.S. Application Data

[63] Continuation-in-part of Ser. No. 842,712, July 17, 1969.

[52] U.S. Cl. .................195/29, 195/49, 195/80 R, 195/96, 260/210, 260/210 AB, 424/181
[51] Int. Cl. ..........................................C12d 9/00
[58] Field of Search............195/80, 81, 49, 29, 96

[56] References Cited

UNITED STATES PATENTS

| | | | |
|---|---|---|---|
| 2,916,485 | 12/1959 | Frohardt et al. | 260/210 AB |
| 3,018,220 | 1/1962 | McGuire et al. | 195/80 X |
| 3,022,228 | 2/1962 | Moses | 195/80 |
| 3,100,176 | 8/1963 | Ehrlich et al. | 195/80 X |
| 3,386,889 | 6/1968 | Moses et al. | 195/80 X |
| 3,433,711 | 3/1969 | Calbrider et al. | 195/80 X |

*Primary Examiner*—Joseph M. Golian
*Attorney*—Merriam, Marshall, Shapiro & Klose

[57] ABSTRACT

The method of making an antibiotic containing an aminocyclitol subunit. A microorganism mutant, incapable of biosynthesizing the aminocyclitol molecule but which molecule the unmutated microorganism biosynthesizes in the formation of an antibiotic when cultivated in a nutrient medium having no added aminocyclitol, is grown in the presence of an added aminocyclitol until substantial antibiotic activity is imparted to a culture medium, and the antibiotic is separated from the medium.

*Streptomyces fradiae* ATCC 21401 mutant grown in the presence of added streptamine gives hybrimycins A1 and A2, and when grown in the presence of 2-epistreptamine gives hybrimycins B1 and B2.

*Streptomyces rimosus* forma *paromomycinus* ATCC 21485 mutant grown in the presence of added streptamine gives hybrimycins C1 and C2.

The hybrimycins have antibiotic activity.

12 Claims, No Drawings

METHOD OF MAKING ANTIBIOTICS CONTAINING THE AMINOCYCLITOL SUBUNIT

This application is a continuation-in-part of our copending application Ser. No. 842,712, filed July 17, 1969.

The invention described herein was made in the course of work carried out, in part, under a grant or award from the Department of Health, Education and Welfare.

This invention relates to antibiotics. More particularly, this invention is concerned with the production of novel antibiotics by growing mutants of microorganisms which, in unmutated form, produce other antibiotics.

By growing various microorganisms, usually by submerged fermentation, a group of antibiotics has been obtained previously which contain an aminocyclitol group or subunit as part of the molecular structure. Among the aminocyclitol antibiotics which have been so produced are hygromycin, spectinomycin and the further defined antibiotics in which the aminocyclitol subunit is deoxystreptamine, including the antibiotics neomycin, paromomycin, kanamycin, gentamicin and nebramycin. The specific microorganisms used to produce such aminocyclitol-containing antibiotics are, in part, as follows:

| Microorganism | Antibiotic |
| --- | --- |
| *Streptomyces fradiae* and *Streptomyces albogriseolus* | neomycin |
| *Streptomyces kanamyceticus* | kanamycin |
| *Streptomyces rimosus* forma *paromomycinus* | paromomycin |
| *Micromonospora echinospora* and *Micromonospora purpurea* | gentamicin |
| *Streptomyces tenebrarius* | nebramycin |
| *Streptomyces hygroscopicus* and *Streptomyces noboritoensis* | hygromycin |
| *Streptomyces spectabilis* and *Streptomyces flavopersicus* | spectinomycin |

In the production of the antibiotic, the microorganism is grown in an aqueous medium containing a soluble carbohydrate, a source of assimilable nitrogen and essential mineral salts. During growth, the microorganism biosynthesizes the aminocyclitol subunit incorporated into the antibiotic formed as a metabolic product. While there are a number of aminocyclitols including streptamine, deoxystreptamine and actinamine, the microorganism generally biosynthesizes and incorporates only one such subunit into an antibiotic. If an aminocyclitol other than the one normally formed by the microorganism could be microbiologically incorporated into the metabolic products, new products having antibiotic activity could be expected.

It has been found according to the present invention that mutants of microorganisms known to produce antibiotics containing an aminocyclitol subunit can be formed which lack the capacity to biosynthesize the aminocyclitol subunit but have the capacity to utilize an added aminocyclitol molecule to form an antibiotic. When the added aminocyclitol molecule is different than the aminocyclitol subunit present in the antibiotic produced by the unmutated microorganism, a new antibiotic is produced. However, when the added aminocyclitol molecule is the same as the aminocyclitol subunit present in the old antibiotic produced by the unmutated microorganism, the mutated microorganism will produce the old antibiotic. The invention thus provides the method of making an antibiotic containing an aminocyclitol subunit, comprising cultivating or growing a microorganism mutant in an aqueous medium containing a soluble carbohydrate, a source of assimilable nitrogen, essential mineral salts and an added aminocyclitol, said mutant being incapable of biosynthesizing the aminocyclitol molecule but which molecule the unmutated microorganism biosynthesizes in the formation of an antibiotic when cultivated in a nutrient medium having no added aminocyclitol, continuing growing the mutant until substantial antibiotic activity is imparted to the culture medium and separating the antibiotic from the medium.

Mutants of antibiotic-producing microorganisms blocked in biosynthetic pathways so as to be incapable of forming the aminocyclitol subunit can be formed by treating conidia with a mutagen over a period of time long enough to permit germination and one or two generations, followed by random killing of cells, leaving among the survivors mutant daughter cells freed of their wild-type counterparts. Treatment with 2-aminopurine, 5-bromouracil or proflavin, each followed by ultraviolet irradiation to achieve a high kill, or nitrosoguanidine alone, gives approximately the same percent auxotrophs among the survivors. For convenience, a nitrosoguanidine treatment is generally used.

A representative method of obtaining a desired mutant is to treat a monoconidial suspension of microorganism spores grown on a vegetable juice agar medium with nitrosoguanidine (0.5 mg/ml) in a basal glutamate medium to kill nearly all the microorganisms, inoculate Petri plates containing vegetable juice agar with the survivors, incubate until sporulation occurs and replica plate to Petri plates containing nutrient agar with and without an added aminocyclitol normally biosynthesized by the unmutated microorganism. Following incubation, the plates are overlaid with agar seeded with *Bacillus subtilis* or some other test organism, and then incubated. The plates are then screened for a colony showing a zone of inhibition on nutrient agar containing the added aminocyclitol but no zone of inhibition on nutrient agar containing no added aminocyclitol. In this way, a suitable mutant is located after which a stock culture of that organism is isolated from the master plate. The mutant so isolated will grow on a defined medium at approximately the same rate as the unmutated microorganism.

A deoxystreptamine-negative mutant of *S. fradiae* was isolated as described and in neomycin production showed a linear dependence on added deoxystreptamine at low concentrations with up to 73 percent conversion. This mutant has been deposited in the American Type Culture Collection on an unrestricted basis and has been given number ATCC 21401.

Two deoxystreptamine-negative mutants of *Streptomyces rimosus* forma *paromomycinus* were also isolated as described. These mutants have been deposited in the American Type Culture Collection on an unrestricted basis and have been given numbers ATCC 21484 and 21485.

A deoxystreptamine-negative mutant of *Streptomyces kanamyceticus* was also isolated as described. This mutant has been deposited in the American Type Culture Collection on an unrestricted basis and has been given number ATCC 21486.

The invention also provides a process of growing the mutants so produced and isolated, in a nutrient medium containing an added aminocyclitol to produce one or more novel antibiotics. Processes for the isolation and recovery of some of the antibiotics are also provided. The medium used can be the same as is normally used to grow the unmutated microorganism, in the absence of an added aminocyclitol, and will contain at least water, a soluble carbohydrate, a source of assimilable nitrogen and essential mineral salts. Since the aminocyclitols are bases, they are readily added as the free base or in the form of an acid addition salt such as the hydrochloride, sulfate or phosphate salts. Submerged fermentation on shakers for 120 hours at 28° C. is usually employed for maximum growth. However, variations in growth conditions may be desirable from one mutant to another so the person skilled in the art should make adjustments to achieve the best results.

After growth is terminated, the broth is filtered and is treated with a suitable anion exchange resin, advisably on the ammonium cycle, to absorb the antibiotic. The resin is then washed with ammonium hydroxide to elute the antibiotic. The eluates are concentrated under reduced pressure and then subjected to paper chromatography to separate and purify the antibiotic.

By growing the *S. fradie* mutant ATCC 21401 in this way in the presence of added streptamine, a mixture of two new antibiotics hybrimycins A1 and A2 is obtained, while with added 2-epistreptamine (but no streptamine), a mixture of two new antibiotics hydrimycins B1 and B2 is obtained. By growing the S. rimosus forma paromomycinus mutant ATCC 21485 in the described way in the presence of added streptamine, a mixture of two new antibiotics hybrimycins C1 and C2 is obtained. The relationship of these new anti-biotics to each other is shown by the following formula.

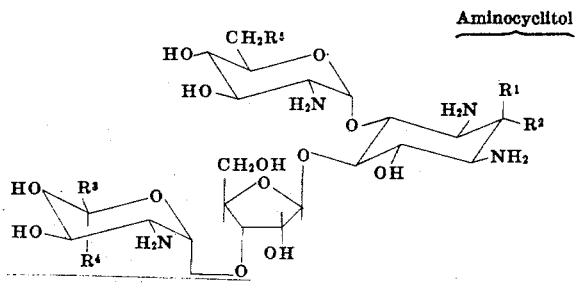

| Antibiotic | $R^1$ | $R^2$ | $R^3$ | $R^4$ | $R^5$ |
|---|---|---|---|---|---|
| Hybrimycin A1 | H | OH | H | $-CH_2NH_2$ | $NH_2$ |
| Hybrimycin A2 | H | OH | $-CH_2NH_2$ | H | $NH_2$ |
| Hybrimycin B1 | OH | H | H | $-CH_2NH_2$ | $NH_2$ |
| Hybrimycin B2 | OH | H | $-CH_2NH_2$ | H | $NH_2$ |
| Hybrimycin C1 | H | OH | H | $-CH_2NH_2$ | OH |
| Hybrimycin C2 | H | OH | $-CH_2NH_2$ | H | OH |

Hybrimycin A1 has the chemical name: [1S,2R,3R,4S,5R,6R]-1,5-diamino-2-(2,6-diamino-2,6-dideoxy-α-D-glucopyranosyl)oxy-3-[3-0-(2,6-diamino-2,6-dideoxy-β-L-idopyranosyl)-β-D-ribofuranosyl]oxy-4,6-dihydroxycyclohexane.

Hybrimycin A2 has the chemical name:
[1S,2R,3R,4S,5R,6R]-1,5-diamino-2-(2,6-diamino-2,6-dideoxy-α-D-glucopyranosyl)oxy-3-[3-0-(2,6-diamino-2,6-dideoxy-α-D-glucopyranosyl)-β-D-ribofuranosyl]oxy-4,6-dihydroxycyclohexane.

Hybrimycin B1 has the chemical name:
[1S,2R,3R,4S,5R,6S]-1,5-diamino-2-(2,6-diamino-2,6-dideoxy-α-D-glucopyranosyl]oxy-3-[3-0-(2,6-diamino-2,6-dideoxy-β-L-idopyranosyl)-β-D-ribofuranosyl]oxy-4,6-dihydroxycyclohexane.

Hybrimycin B2 has the chemical name:
[1S,2R,3R,4S,5R,6S]-1,5-diamino-2-(2,6-diamino-2,6-dideoxy-α-D-glucopyranosyl)oxy-3-[3-0-(2,6-diamino-2,6-dideoxy-α-D-glucopyranosyl)-β-D-ribofuranosyl]oxy-4,6-dihydroxycyclohexane.

Structurally, hybrimycins A1, A2, B1 and B2 resemble neomycin except that the deoxystreptamine moiety has been replaced by another aminocyclitol. Also, similar to the unmutated microorganism's production of neomycins B and C is the production by the mutant, in each biosynthetic replacement of deoxystreptamine, of two new antibiotics.

Hybrimycin C1 has the chemical name:
[1S,2R,3R,4S,5R,6R]-1,5-diamino-2-(2-amino-2-deoxy-α-D-glucopyranosyl)oxy-3-[3-0-(2,6-diamino-2,6-dideoxy-β-L-idopyranosyl)-β-D-ribofuranosyl]oxy-4,6-dihydroxycyclohexane.

Hybrimycin C2 has the chemical name:
[1S,2R,3R,4S,5R,6R]-1,5-diamino-2-(2-amino-2-deoxy-α-D-glucopyranosyl)oxy-3-[3-0-(2,6-diamino-2,6-dideoxy-α-D-glucopyranosyl)-β-D-ribofuranosyl]oxy-4,6-dihydroxycyclohexane.

Structurally, hybrimycins C1 and C2 resemble paromomycin except that the deoxystreptamine moiety has been replaced by another aminocyclitol. Also, similar to the unmutated organism's production of paromomycins I and II is the production by the mutant of two new antibiotics each bearing the replacement of the deoxystreptamine moiety.

The S. kanamyceticus mutant ATCC 21486 has also been grown and antibiotics produced which are different than kanomycin.

ADDITIONAL DATA ON HYBRIMYCINS A1, A2, B1 and B2

Hexa-N-acetylhybrimycins are readily produced by reacting a hybrimycin with acetic anhydride plus 3M dipotassium hydrogen phosphate according to the method of Pan and Dutcher, Anal. Chem. 28, 836 (1956). The hexa-N-acetylhybrimycins A1 and A2, and hexa-N-acetylhybrimycins B1 and B2, are readily separated and purified by paper chromatography in the solvent system 1-butanol:pyridine:water:6:4:3.

Optical rotational and $R_f$ differences between the hexa-N-acetylhybrimycins A1 and A2, and between hexa-N-acetylhybrimycins B1 and B2, correspond closely to the differences between hexa-N-acetylneomycins B and C. The differences in optical rotation and $R_f$ values between hexa-N-acetylhybrimycin A1 and hexa-N-acetylneomycin B correspond to the differences between the latter and hexa-N-acetylhybrimycin B1, and a similar relationship exists between hexa-N-acetylhydrimycins A2 and B2 and hexa-N-acetylneomycin C. The differences are shown by the data in Table I. These relationships support the indicated stereochemistry of the hybrimycins A & B.

TABLE I

Properties of N-Acetyl Derivatives

| Antibiotic Derivatized | $[\alpha]_D^{24}$ (c 0.01, in $H_2O$) | $R_f{}^a$ |
|---|---|---|
| Hybrimycin A1 | 44.6° | 0.32 |
| Hybrimycin A2 | 80.5° | 0.19 |
| Hybrimycin B1 | 52.0° | 0.37 |
| Hybrimycin B2 | 94.4° | 0.19 |
| Neomycin B | 48.5° | 0.41 |
| Neomycin C | 90.2° | 0.30 |

[a] $R_f$ values are for paper chromatography in the solvent system 1-butanol:pyridine:water:6:4:3.

Hexa-N-acetylhybrimycins A1 and B1 are readily converted to octa-O-trimethylsilyl-hexa-N-acetylhybrimycins A1 and B1 by reacting with N,0-bis-(trimethylsilyl)-acetamide in anhydrous pyridine. The mass spectra of these derivatives show molecular ions at m/e 1458, the expected molecular weight, as well as fragments at m/e 389 and 665 corresponding to the non-aminocyclitol moieties of the antibiotics. The nuclear magnetic resonance spectra of hybrimycins A and B show no absorption by methylene protons ($ABX_2$ multiplet) characteristic of the deoxystreptamine moiety of neomycin. This establishes that the hybrimycins A & B have the indicated structure.

The antibacterial activity of the hybrimycin A and hybrimycin B complexes or mixtures and of hybrimycins A1, A2, B1 and B2 against various test organisms is illustrated by the following data.

1. ANTIBACTERIAL ACTIVITY OF COMPLEXES OF HYBRIMYCINS A AND B:

These antibiotic complexes were dissolved in brain heart infusion broth and twofold decrements were made from 200 μg/ml. An 18-hour culture of each test organism was diluted 1:2,000 and one drop of the diluted suspension was added to 1 ml of broth with the antibiotic. The test system was estimated to contain $10^5$ organisms per ml. All tubes were incubated at 37° C. for 24 hours. The minimum inhibitory concentration is the lowest concentration of antibiotic which prevented growth. The results are given in Table II.

TABLE II

Antibacterial Activity of Hybrimycins A and B

| Test Organism[a] | MIC[b] ($\mu$g/ml) | | |
| --- | --- | --- | --- |
| | Neomycin | Hybrimycin A | Hybrimycin B |
| *Staphylococcus aureus* OSU 284 | 0.3 | 0.8 | 1.6 |
| *Staphylococcus aureus* UC 552 | 1.1 | 1.6 | 1.6 |
| *Staphylococcus aureus* ATCC 151 | 0.1 | 0.2 | 0.4 |
| *Streptococcus hemolyticus* UC 152 | 8.4 | 50.0 | 50.0 |
| *Streptococcus faecalis* ATCC 6057 | 8.4 | 50.0 | 5.00 |
| *Streptococcus faecalis* UC 3235 | 16.7 | 50.0 | 100.0 |
| *Escherichia coli* ATCC 26 | 4.3 | 3.2 | 12.5 |
| *Proteus vulgaris* ATCC 8427 | 4.3 | 6.4 | 12.5 |
| *Klebsiella pneumoniae* ATCC 10031 | 0.5 | 0.8 | 1.6 |
| *Salmonella schottmuelleri* ATCC 9149 | 4.3 | 6.4 | 12.5 |
| *Pseudomonas aeruginosa* ATCC 9027 | 4.3 | 12.5 | 100.0 |
| *Bacillus subtilis* UC 564 | <0.1 | <0.1 | 0.4 |

[a]OSU, Ohio State University; UC, Upjohn Co.; ATCC, American Type Culture Collection.
[b]Minimum inhibitory concentration.

2. ANTIBACTERIAL ACTIVITY OF HYBRIMYCINS A1, A2, B1 and B2

The potency of hybrimycin A1, A2, B1 and B2 preparations was compared to that of neomycin by use of the standard agar diffusion plate assay procedure. The test organism used was *Escherichia coli* ATCC 11775. Bio-assay agar (medium A) having the composition:

| Beef extract | 1.5 g |
| --- | --- |
| Yeast | 3.0 g |
| Peptone | =6.0 g |
| Agar | 15.0 g |
| Water | 1000 ml | was autoclaved for 20 minutes at 120° C., cooled to 46° C., and inoculated with 5 ml of a suspension of late log phase cells of the test organism in the following medium (medium B), per 100 ml of the bio-assay agar (medium A);

| | Grams |
| --- | --- |
| Beef extract | 0.4 |
| Cerelose | 1.0 |
| Peptone | 0.4 |
| Yeast extract | 0.1 |
| Sodium chloride | 0.25 |

A volume of 8 ml of the inoculated medium was poured into each of a series of Petri dishes. Filter paper discs (12.7 mm in diameter) were dipped in aqueous solutions of the material to be assayed and the disc was placed on the surface of the agar. The plates were stored at zero to 4° C. for 2 hours and then incubated 12 to 16 hours at 28° C. Zone sizes at various concentrations from 5 to 100 $\mu$g/ml were plotted against the log of the concentration of each antibiotic to afford standard curves from which the concentration of hybrimycins in various preparations could be determined by comparison. The following Table III gives the data derived from the semilog plots.

TABLE III

| Antibiotic | Concentration of Antibiotic At Same Zone Size Produced by 5 $\mu$g/ml Neomycin B |
| --- | --- |
| Hybrimycin A1 | 19.7 $\mu$g/ml |
| A2 | 23.8 $\mu$g/ml |
| B1 | 47.5 $\mu$g/ml |
| B2 | 66.8 $\mu$g/ml |

ADDITIONAL DATA ON HYBRIMYCINS C1 AND C2

Penta-N-acetylbybrimycins C1 and C2 are prepared by the method described for the preparation of hexa-N-acetylhybrimycins A1, A2, B1 and B2.

Optical rotations and Rf values of penta-N-acetylhybrimycins C1 and C2 correspond to those of penta-N-acetyl-paromomycins I and II except that the specific rotations of hybrimycin C1 and C2 are less dextrorotatory as shown in the following Table IV.

TABLE IV

Properties of Penta-N-Acetylhybrimycins C1 and C2

| Antibiotic Derivatized | $[\alpha]_D^{19.5}$ (c 0.01, in $H_2O$) | $R_f$[a] |
| --- | --- | --- |
| Hybrimycin C1 | 60.6° | 0.36 |
| Hybrimycin C2 | 81.9° | 0.24 |
| Paromomycin I | 64.5° | 0.33 |
| Paromomycin II | 87.8° | 0.21 |

[a]$R_f$ values are for paper chromatography in the solvent system 1-butanol:pyridine:water:6:4:3.

Since hexa-N-acetyl-hybrimycins A1 and A2 are less dextrorotatory than hexa-N-acetylneomycins B and C, respectively, due to the presence of an additional hydroxyl group in the 6R configuration, the additional hydroxyl group in hybrimycins C1 and C2 must also be in the 6R configuration.

Penta-N-acetyl hybrimycins C1 and C2 are readily converted to nona-O-trimethylsilyl-penta-N-acetylhybrimycins C1 and C2 by reaction with N,O-bis-(trimethylsilyl)-acetamide in anhydrous pyridine-N-,N-dimethylformamide. The mass spectra of these derivatives show molecular ions at m/e 1489, the expected molecular weight, as well as fragments at m/e 389, 420 and 665, corresponding to non-aminocyclitol moieties of the antibiotics. The nuclear magnetic resonance spectrum of hybrimycin C shows no absorption by methylene protons ($ABX_2$ multiplet) characteristic of the deoxystreptamine moiety of paromomycin. This establishes that hybrimycins C1 and C2 have the indicated structures.

The antibacterial activity of hybrimycins C1 and C2 against various test organisms is illustrated by the following data.

1. Hybrimycins C1 and C2 were dissolved in brain heart infusion broth and twofold decrements were made from 200 $\mu$g/ml. An 18-hour culture of each test organism was diluted 1:2,000 and one drop of the diluted suspension was added to 1 ml. of broth with the antibiotic. The test system was estimated to contain $10^5$ organisms per ml. All tubes were incubated at 37° C for 24 hours. The results are given in Table V.

TABLE V

Antibacterial Activity of Hybrimycins C1 and C2

| Test Oganism[a] | MIC[c] ($\mu$g/ml) | | |
| --- | --- | --- | --- |
| | Paromomycin | Hybrimycin C1 | Hybromycin C2 |
| *Escherichia coli* ATCC 26 | 17.8 | 25.0 | 50.0 |

| | | | |
|---|---|---|---|
| Staphylococcus aureus UC80 | 2.1 | 6.2 | 12.5 |
| Klebsiella pneumoniae ATCC 10031 | 4.4 | 6.2 | 12.5 |
| Proteus vulgaris ATCC 8427 | 8.9 | 25.0 | 50.0 |
| Sarcina lutea UC 130 | >35.7 | >50.0 | >50.0 |
| Pseudomonas fluorescens UC 3049 | 0.6 | 1.6 | 6.2 |
| Streptococcus pyogenes UC 146 | 17.8 | 25.0 | 25.0 |
| Bacillus subtilis UC 564 | 1.1 | 3.1 | 3.1 |

<sup>a</sup>ATCC, American Type Culture Collection; UC, Upjohn Co.
<sup>b</sup>Minimum inhibitory concentration.

2. The comparative antibacterial activity of paromomycin and hybrimycins C1 and C2 against a strain of *Bacillus subtilis* was determined. The antibiotic preparations were dissolved in the following medium (Medium L) and twofold decrements were made from 200 μg/ml.

| | |
|---|---|
| Peptone | 5.0 g |
| Beef extract | 1.5 g |
| Yeast extract | 1.5 g |
| Glucose | 1.0 g |
| Sodium chloride | 3.5 g |
| Dipotassium monohydrogen phosphate | 3.68 g |
| Potassium dihydrogen phosphate | 1.32 g |
| Water | 1000 ml |

A growing culture of the test organism was diluted 1:2,000 and one drop of the diluted suspension was added to 1 ml. of broth with the antibiotic. All tubes were incubated at 37° C for 24 hrs. The results are reported in Table VI. The minimum inhibitory concentration (MIC) is the lowest concentration of antibiotic which prevented growth.

TABLE VI

Antibacterial Activity of Hybrimycins C1 and C2

| | MIC (μg./ml.) | | |
|---|---|---|---|
| Test Organism | Paromomycin | Hybrimycin C1 | Hybrimycin C2 |
| Bacillus subtilis | 6.25 | 25.0 | 50.0 |

EXAMPLE 1

Preparation of S. fradiae Mutant ATCC 21401

A mutant of the organism *Streptomyces fradiae* was prepared by treatment of *S. fradiae* 3535 with N-methyl-N'-nitro-N-nitrosoguanidine. A slant containing 5 ml of the following medium (medium C)

| | |
|---|---|
| Mixed vegetable juice (V-8 juice) | 20 ml |
| Calcium carbonate | 0.3 g. |
| Agar | 2.0 g. |
| Distilled water to 100 ml | | was inoculated from soil stock of *S. fradiae* 3535. After incubation for 7 days at 28° C., spores from a slant were suspended in water and transferred to 100 ml of the following medium (medium D) in a 500 ml Erlenmeyer flask:

| | Grams |
|---|---|
| Glucose | 5 |
| L-Glutamic acid | 10 |
| Dipotassium hydrogen phosphate | 1.5 |
| Magnesium sulfate heptahydrate | 0.025 |
| Calcium chloride | 0.025 |
| Ferrous sulfate heptahydrate | 0.015 |
| Zinc sulfate heptahydrate | 0.005 |
| Distilled water to 1000 ml | |

Prior to the inoculation, medium D had been adjusted to pH 7.0 with potassium hydroxide and autoclaved 20 minutes at 120° C. The glucose had been autoclaved separately as a 50 percent stock solution. To a flask containing the above inoculated medium (D), was added 50 mg of N-methyl-N'-nitro-N-nitrosoguanidine, and the vessel was incubated 12 hours at 28° C. with reciprocal shaking. Petri plates containing 10 ml of the V-8 agar (medium C) were inoculated with a diluted suspension of the organism in the flask and incubated at 28° C. until sporulation occurred. Spores were transferred by the replica plating technique to Petri plates containing 10 ml of the following medium (medium E):

| | Grams |
|---|---|
| Peptone | 0.5 |
| Beef extract | 0.4 |
| Sodium chloride | 0.5 |
| Agar | 1.5 |
| Tap water to 100 ml | |

The pH was adjusted to 7.2 –7.4 and the medium (E) was autoclaved for 20 minutes at 120° C.

Spores from the same V-8 agar plate were also transferred by the same technique to Petri plates containing the same medium plus 200 μg/ml of 2-deoxystreptamine dihydrobromide. The Petri plates were incubated 44 hours at 28° C. at which time 8 ml of another medium (medium F) was added to the plates. Medium F was Bacto Streptomycin assay agar (medium A) sterilized at 120° C. for 20 minutes, cooled to 46° C. and mixed with 5 ml of late log phase cells of *Bacillus subtilis* per 100 ml of the assay agar.

The plates were stored at 0° C. for 1 hour and incubated at 28° C. for 14 hours. The plates were examined for a colony that showed a zone of inhibition on the medium containing 2-deoxystreptamine dihydrobromide but no zone of inhibition on the medium lacking 2-deoxystreptamine dihydrobromide. The mutant ATCC 21401 was isolated from the V-8 agar (medium C) plate.

The so-isolated deoxystreptamine-negative mutant grows in a defined medium at approximately the same rate as the unmutated *S. fradiae*. This mutant has been deposited in the American Type Culture Collection on an unrestricted basis and has been given number ATCC 21401. Antibiotic production showed a linear dependence on added deoxystreptamine at low concentrations with up to 73 percent conversion of added deoxystreptamine dihydrobromide as determined by assay against *B. subtilus*.

ANTIBIOTIC PRODUCTION WITH THE *S. FRADIAE* MUTANT ATCC 21401

By growing the mutant ATCC 21401 in a nutrient medium containing the aminocyclitol streptamine, a mixture of two new antibiotics, hybrimycins A1 and A2, are obtained. When the medium contains the aminocyclitol 2-epistreptamine, a mixture of two other new antibiotics, hybrimycins B1 and B2, are obtained. There follow examples to illustrate the production, recovery, concentration, purification, and structural proof of these four hybrimycin antibiotics.

EXAMPLE 2

Production of Hybrimycins A1 and A2 and Recovery

To produce hybrimycins A, test tube slants were prepared, each containing 5 ml of medium C. The slants were autoclaved at 120° C. for 20 minutes and allowed to set at a 30° angle. A slant was inoculated with spores of the deoxystreptamine-negative mutant *S. fradiae* ATCC 21401 from a soil stock culture and incubated 7 days at 28° C. An aqueous suspension (5 ml) of spores from this slant was used to inoculate a 500 ml Erlenmeyer flask containing 100 ml of the following seed medium (medium G):

|  | Grams |
| --- | --- |
| Glucose | 1 |
| Hydrolyzed casein (N-Z-Amine A), (SHEFFIELD Farms, Inc.) | 1 |
| Diammonium phosphate, anhydrous | 0.5 |
| Magnesium sulfate heptahydrate | 0.05 |
| Cupric sulfate, pentahydrate | 0.005 |
| Ferrous sulfate, heptahydrate | 0.005 |
| Calcium carbonate | 1 |
| Tap water to 100 ml | |

Prior to inoculation, the medium was adjusted to pH 7.4 with potassium hydroxide solution and flasks of the medium were autoclaved at 120° C. for 20 minutes. The glucose was sterilized separately as a 50 percent stock solution and added to the medium before inoculation.

The flask containing the medium G was incubated at 28° C. with reciprocal shaking for 40–48 hr., at the end of which time 4 ml was transferred from it to 500 ml Erlenmeyer flasks containing 100 ml of the following production medium (medium H):

|  | Grams |
| --- | --- |
| Glucose | 1 |
| Soybean meal | 2.5 |
| Yeast extract | 0.5 |
| Sodium chloride | 0.5 |
| Calcium carbonate | 0.2 |
| Streptamine hydrosulfate | 0.025 |
| Distilled water to 100 ml | |

Prior to inoculation, the medium was adjusted to pH 7.0 – 7.1 with potassium hydroxide solution and autoclaved 20 minutes at 120° C.

The vessels containing the production medium were incubated for 120 hours at 28° C. with reciprocal shaking. After the indicated period of time, the beer was filtered through milk filters and 2 liters of the cloudy filtrate was twice passed slowly down a column of 50 ml of a weakly acidic, carboxylic (polymethacrylic) type cation exchange resin of medium porosity (Amberlite IRC–50) in the ammonium form. The spent beer was discarded, the column was washed with 4 liters of deionized water and eluted with 200 ml of 2 N ammonium hydroxide solution. The eluate was evaporated under reduced pressure (0.2 mm), the residue was dissolved in a small portion of water, applied to chromatographic paper (Whatman 3 MM paper) and chromatographed with absolute methanol:concentrated ammonium hydroxide:4:1. The location of the antibiotic was visualized on strips cut from the chromatogram by spraying in succession, followed by air drying, with aqueous sodium hypochlorite (1 percent), twice with 95 percent ethanol and finally with a saturated solution of benzidine in 2 percent aqueous acetic acid containing a crystal of potassium iodide. The segments of paper corresponding to the major blue spot were cut out and eluted with deionized water. The eluate was lyophilized to yield 196 mg of a white, amorphous powder with antibacterial activity. The white powder was a mixture of hybrimycin A1 and hybrimycin A2.

Hybrimycin A1 was separated from hybrimycin A2 by chromatography on paper as described in the previous paragraph except that the leading one-third of the paper segment corresponding to the blue spot was eluted separately to yield hybrimycin A1; similarly the trailing one-third yielded hybrimycin A2. The remainder of the material was eluted and rechromatographed.

Hexa-N-acetylhybrimycins A1 and A2 were prepared by reacting a mixture of hybrimycins A1 and A2 with acetic anhydride in the presence of a 3 molar dipotassium hydrogen phosphate solution according to the method of Pan and Dutcher, *Anal. Chem.*, 28, 836 (1956). Hexa-N-acetylhybrimycins A1 and A2 were separated and purified by paper chromatography using the solvent system 1-butanol:pyridine:water:6:4:3.

EXAMPLE 3

Production of Hybrimycins B1 and B2 and Recovery

A mixture of hybrimycins B1 and B2 was produced using the same mutant ATCC 21401 and in the same manner as hybrimycins A1 and A2 in Example 2 except that the production medium (medium H) contained 2-epistreptamine dihydrochloride (0.025 gram per 100 ml of medium) and contained no streptamine hydrosulfate. Two liters of incubated production medium so obtained yielded 56 mg of a white, amorphous powder with antibacterial activity. The powder was a mixture of hybrimycin B1 and hybrimycin B2. Hybrimycin B1 was separated from hybrimycin B2 in the same manner as hybrimycin A1 was separated from hybrimycin A2 in Example 2.

Hexa-N-acetylhybrimycins B1 and B2 were prepared by reacting a mixture of hybrimycins B1 and B2 with acetic anhydride in the presence of a 3 molar dipotassium hydrogen phosphate solution according to the method of Pan and Dutcher, *Anal. Chem.*, 28, 836 (1956). Hexa-N-acetylhybrimycins B1 and B2 were separated and purified by paper chromatography using the solvent system 1-butanol:pyridine:water:6:4:3.

EXAMPLE 4

Preparation of *S. rimosus* forma *paromomycinus* ATCC 21484 and 21485

Two mutants of the organism *Streptomyces rimosus* forma *paromomycinus* were prepared by treatment of *S. rimosus* forma *paromomycinus* ATCC 14827 with N-methyl-N'-nitro-N-nitrosoguanidine. A slant containing 5 ml. of medium C was inoculated from a soil stock of *S. rimosus* forma *paromomycinus* ATCC 14827. After incubation for at least 7 days at 26° C, spores from a slant were suspended in water and transferred to 100 ml. of sterile medium L supplemented with 3 mg. of N-methyl-N'-nitro-N-nitrosoguanidine, and the vessel was incubated for 12 hours at 26° C. with reciprocal shaking. Aliquots of this broth were treated in the manner described for the isolation of the deoxystreptamine-negative mutant of *S. fradiae* (ATCC 21401). Two deoxystreptamine-negative mutants of *S. rimosus* forma *paromomycinus* were isolated from the medium C plate, and deposited in the American Type Culture Collection on an unrestricted basis and given numbers ATCC 21484 and 21485.

ANTIBIOTIC PRODUCTION WITH THE *S. RIMOSUS* FORMA *PAROMOMYCINUS* MUTANT ATCC 21485

By growing the mutant ATCC 21485 in a nutrient medium containing the aminocyclitol streptamine, a mixture of two new antibiotics, hybrimycins C1 and C2, were obtained. There follows an example to illustrate the production, recovery, concentration, purification, and structural proof of these two hybrimycin antibiotics.

EXAMPLE 5

Production of Hybrimycins C1 and C2 and Recovery.

To produce hybrimycins C1 and C2, test tube slants were prepared, each containing 5 ml of medium C (Example 1). The slants were autoclaved at 120° C. for 20 minutes and allowed to set at a 30° angle. A slant was inoculated with spores of the deoxystreptamine-negative mutant of *S. rimosus* forma

*paromomycinus* mutant ATCC 21485 from a soil stock and incubated 5 days at 26° C. An aqueous suspension (5 ml.) of spores from this slant was used to inoculate a 500 ml. Erlenmyer flask containing 100 ml. of the following seed medium (medium J):

|  | Grams |
|---|---|
| Cerelose | 1.0 |
| Soybean meal | 1.0 |
| Sodium chloride | 0.5 |
| Calcium carbonate | 0.5 |
| Ammonium chloride | 0.167 |
| Casein | 0.25 |
| Tap water to 100 ml |  |

Prior to inoculation, the medium was adjusted to pH 7.5 with sodium hydroxide solution and flasks of the medium were autoclaved at 120° C. for 20 minutes.

The flask containing medium J was incubated at 26° C. for 64 hrs. with reciprocal shaking, and 7.5 ml aliquots were used to inoculate 100 ml. portions of the production medium (medium K) in 500 ml shake flasks. Medium K contains the components of medium J plus 40 mg of streptamine hydrosulfate per 100 ml. The production flasks were incubated at 26° C for 5 days with reciprocal shaking. The contents of the flasks were pooled and the beer was filtered through cotton cloth. The filtrate was treated in the same manner as the production broths of the other hybrimycins. From 2 liters of filtrate, 82 mg. of a white amorphous powder with antibacterial activity was obtained. The white powder was a mixture of hybrimycins C1 and C2.

Hybrimycin C1 was separated from C2 as described for the separation of hybrimycins A1 and A2, and B1 and B2.

Penta-N-acetylhybrimycins C1 and C2 were prepared, separated and purified by the procedure described for hexa-N-acetylhybrimycins A1 and A2.

The mutants ATCC 21484 and 21485 appear to be very similar. By growing the mutant ATCC 21484 in a nutrient medium containing the aminocyclitol streptamine, an antibiotic substance was also produced.

EXAMPLE 6

Preparation of S. kanamyceticus ATCC 21486

A mutant of the organism *Streptomyces kanamyceticus* was prepared by treatment of *S. kanamyceticus* ATCC 12853 with N-methyl-N'-nitro-N-nitrosoguanidine. Slants containing 5 ml. of medium C were inoculated from a soil stock of *S. kanamyceticus* ATCC 12853. After incubation for at least 5 days at 26° C, spores from a slant were suspended in water and transferred to 100 ml. of sterile medium L supplemented with 2 mg. of N-methyl-N'-nitro-N-nitrosoguanidine, and the vessel was incubated for 6 hours at 26° C with reciprocal shaking. After incubation, 1 ml. aliquots were diluted 10-fold in sterile water, and 1 ml. aliquots of the diluted suspension were transferred to slants containing 5 ml. of medium C and incubated at 26° C for at least 5 days. The growth from one of these slants was transferred to 100 ml. of sterile water and blended in a blender for 8 min. One ml. aliquots of this suspension were subjected to serial dilution through three tubes of 9 ml. of sterile water. Aliquots of the final dilution were treated in the manner described for the isolation of the deoxystreptamine-negative mutant of *S. fradiae* (ATCC 21401). A deoxystreptamine-negative mutant of *S. kanamyceticus* was isolated from a medium C plate and deposited in the American Type Culture Collection on an unrestricted basis and given number ATCC 21486.

EXAMPLE 7

Fermentation of *S. kanamyceticus* Mutant ATCC 21486.

The mutant of *Streptomyces kanamyceticus* ATCC 21486 was grown in streak cultures in 40 Petri dishes containing 10 ml. of medium E supplemented with 25 mg of 2-epistreptamine dihydrochloride per 100 ml of medium E for 72 hr. at 26° C. The contents of the Petri plates were pooled, frozen, thawed, filtered, and the filtrate passed down a column of 25 ml of a weakly acidic carboxylic (polymethacrylic) type cation exchange resin of medium porosity (Amberlite IRC-50) in the ammonium form. The 50) filtrate was discarded, the column washed with 1 liter of deionized water, and eluted with 100 ml of 2N ammonium hydroxide solution. The eluate was evaporated under reduced pressure (0.2 mm), the residue dissolved in 1.0 ml of water, and 100 $\mu$l applied to chromatographic paper (Whatman No. 1). A sample of 20 $\mu$g of authentic kanamycin (Kantrex, Bristol) was applied to the same paper, and the materials chromatographed with absolute methanol: concentrated ammonium hydroxide solution: 4:1. The location of the antibiotics was visualized by placing the chromatograph on the surface of 150 ml of medium A that had been autoclaved for 20 min., cooled to 48° C and mixed with 5 ml of a suspension of spores of *Bacillus subtilis* in medium B, then allowed to set in an 8 by 14 inch dish. After 4 min. the paper was removed, and the medium incubated at 26° C for 20 hr. Zones of inhibition of growth of *B. subtilis* indicate the location of antibiotic on the original chromatogram. The antibiotic from the mutant of *S. kanamyceticus* has a lower $R_f$ value (0.18) than that of kanamycin ($R_f = 0.54$), indicating the new antibiotic is similar in structure, but is more polar, consistent with the presence of an additional hydroxyl group.

The antibiotics of this invention are useful antimicrobial agents. Amongst the uses, is their use as topical agents to render surfaces sterile or to substantially reduce the presence of bacteria thereon.

What is claimed is:

1. The method of making an antibiotic containing an aminocyclitol subunit which comprises:

cultivating a microorganism mutant in an aqueous medium containing a soluble carbohydrate, a source of assimilable nitrogen, essential mineral salts and an added aminocyclitol;

said mutant being incapable of biosynthesizing the aminocyclitol molecule but which molecule the unmutated microorganism biosynthesizes in the formation of an antibiotic when cultivated in a nutrient medium having no added aminocyclitol;

continuing growing the mutant until substantial antibiotic activity is imparted to the culture medium; and separating the antibiotic from the medium.

2. The method of claim 1 in which the mutant is incapable of biosynthesizing deoxystreptamine, and deoxystreptamine and the added aminocyclitol have dissimilar groups.

3. The method of making an aminocyclitol-containing antibiotic which comprises:

cultivating a mutant of (a) *Streptomyces fradiae*, (b) *Streptomyces albogriseolus*, (c) *Streptomyces kanamyceticus*, (d) *Streptomyces rimosus* forma *paromomycinus*, (e) *Micromonospora echinospora*, (f) *Micromonospora purpurea*, (g) *Streptomyces tenebrarius*, (h) *Streptomyces hygroscopicus*, (i) *Streptomyces noboritoensis*, (j) *Streptomyces spectabilis*, and (k) *Streptomyces flavopersicus*, in an aqueous medium containing a soluble carbohydrate, a source of assimilable nitrogen, essential mineral salts and an added aminocyclitol;

said mutant being incapable of biosynthesizing the aminocyclitol molecule but which molecule the unmutated microorganism biosynthesizes in the formation of an antibiotic according to the correlation;

| Unmutated Microorganism | Antibiotic |
|---|---|

| | |
|---|---|
| (a) and (b) | neomycin |
| (c) | kanamycin |
| (d) | paromomycin |
| (e) and (f) | gentamicin |
| (g) | nebramycin |
| (h) and (i) | hygromycin |
| (j) and (k) | spectinomycin | when cultivated in a nutrient medium having no added aminocyclitol;

continuing growing the mutant until substantial antibiotic activity is imparted to the culture medium; and, separating the antibiotic from the medium.

4. The method of making an antibiotic containing an aminocyclitol subunit which comprises:

cultivating the microorganism *Streptomyces fradiae* ATCC 21401 in an aqueous medium containing a soluble carbohydrate, a source of assimilable nitrogen, essential mineral salts and an added aminocyclitol;

continuing growing the microorganism until substantial antibiotic activity is imparted to the culture medium; and separating the antibiotic from the medium.

5. The method of claim 4 in which the added aminocyclitol is streptamine.

6. The method of claim 4 in which the added aminocyclitol is 2-epistreptamine.

7. The method of claim 5 in which the antibiotic produced is a mixture of hybrimycin A1 and hybrimycin A2.

8. The method of claim 6 in which the antibiotic produced is a mixture of hybrimycin B1 and hybrimycin B2.

9. The method of making an antibiotic containing an aminocyclitol subunit which comprises:

cultivating the microorganisms *Streptomyces rimosus* forma *paromomycinus* ATCC 21484 or 21485 in an aqueous medium containing a soluble carbohydrate, a source of assimilable nitrogen, essential mineral salts and an added aminocyclitol;

continuing growing the microorganism until substantial antibiotic activity is imparted to the culture medium; and separating the antibiotic from the medium.

10. The method of claim 9 in which the added aminocyclitol is streptamine.

11. The method of making an antibiotic containing an aminocyclitol subunit which comprises:

cultivating the microorganism *Streptomyces kanamyceticus* ATCC 21486 in an aqueous medium containing a soluble carbohydrate, a source of assimilable nitrogen, essential mineral salts and an added aminocyclitol; and continuing growing the microorganism until substantial antibiotic activity is imparted to the culture medium.

12. The method of claim 1 in which the added aminocyclitol is 2-epistreptamine.

* * * * *

UNITED STATES PATENT OFFICE
CERTIFICATE OF CORRECTION

Patent No. 3,669,838      Dated March 17, 1970

Inventor(s) Wayne Thomas Shier, Kenneth L. Rinehart, Jr. and David Gottlieb

It is certified that error appears in the above-identified patent and that said Letters Patent are hereby corrected as shown below:

Column 3, line 25, -- R2 -- should be "$R^2$"; column 5, line 20, -- 5.00 -- should be "50.00"; column 5, line 50, -- =6.0g -- should be "6.0g"; column 12, line 13, -- 50) -- should be "spent".

Signed and sealed this 10th day of October 1972.

(SEAL)
Attest:

EDWARD M. FLETCHER, JR.      ROBERT GOTTSCHALK
Attesting Officer      Commissioner of Patents